United States Patent [19]

Nagashima

[11] 4,202,096
[45] May 13, 1980

[54] PORTABLE CHAIN SAW

[75] Inventor: Akira Nagashima, Kawasaki, Japan

[73] Assignee: Kioritz Corporation, Tokyo, Japan

[21] Appl. No.: 940,684

[22] Filed: Sep. 8, 1978

[30] Foreign Application Priority Data

Apr. 24, 1978 [JP] Japan .................................. 53-48480

[51] Int. Cl.² .............................................. B27B 17/00
[52] U.S. Cl. ..................................................... 30/381
[58] Field of Search ................. 30/381, 382, 383, 384, 30/385, 386

[56] References Cited

U.S. PATENT DOCUMENTS

| 3,728,793 | 4/1973 | Makinson | 30/383 |
| 3,849,883 | 11/1974 | Kolorz | 30/381 |
| 3,934,344 | 1/1976 | Inaga | 30/381 |
| 3,945,119 | 3/1976 | Nagashima | 30/383 |
| 4,135,301 | 1/1979 | Hoeppner | 30/381 |

Primary Examiner—Jimmy C. Peters
Attorney, Agent, or Firm—Karl W. Flocks

[57] ABSTRACT

A portable chain saw having a drive-part assembly including an engine, saw chain and so forth, and a supporting assembly including a front and a rear handles and so on. These two assemblies are resiliently connected to each other through a plurality of tubular resilient connecting members. Each of the tubular resilient connecting members carries at its outer peripheral surface one of the two assemblies, and is connected to the other assembly through a screw or a bolt received by the bore thereof.

2 Claims, 6 Drawing Figures

PORTABLE CHAIN SAW

BACKGROUND OF THE INVENTION

The present invention relates to a portable chain saw and, more particularly, to a lightweight and small-sized chain saw having a noticeable vibration damping effect.

The present inventors have proposed, in Japanese Patent Laid-open Publication No. 131,197/1975, a chain saw having a drive-part assembly including an engine, a guide bar and a saw chain, and a supporting assembly including an oil tank, fuel tank, front and rear handles and a recoil starter, the drive-part assembly and the supporting assembly being connected to each other through resilient members.

SUMMARY OF THE INVENTION

It is an object of the invention to provide a portable chain saw of the above-described type and having an improved resilient member which exhibits a noticeable vibration damping effect.

It is another object of the invention to provide a portable chain saw which is easy to assemble and in which the number of parts required for fixing the resilient members is reduced to reduce the weight and size of the chain saw as a whole.

To these ends, according to the invention, there is provided a portable chain saw having a drive-part assembly including an engine, saw chain and so forth, a supporting assembly including front and rear handles, and resilient members through which both assemblies are connected to each other, wherein each of the resilient members has a tubular form, the tubular resilient member being connected to one of the assemblies through a screw received by the hollow part of the resilient member and carrying the other of the assemblies at its tubular body portion.

These and other objects, as well as advantageous features of the invention will become more clear from the following description of the preferred embodiments taken in conjunction with the accompanying drawings.

DESCRIPTION OF THE PREFERRED EMBODIMENT

Figure 1:
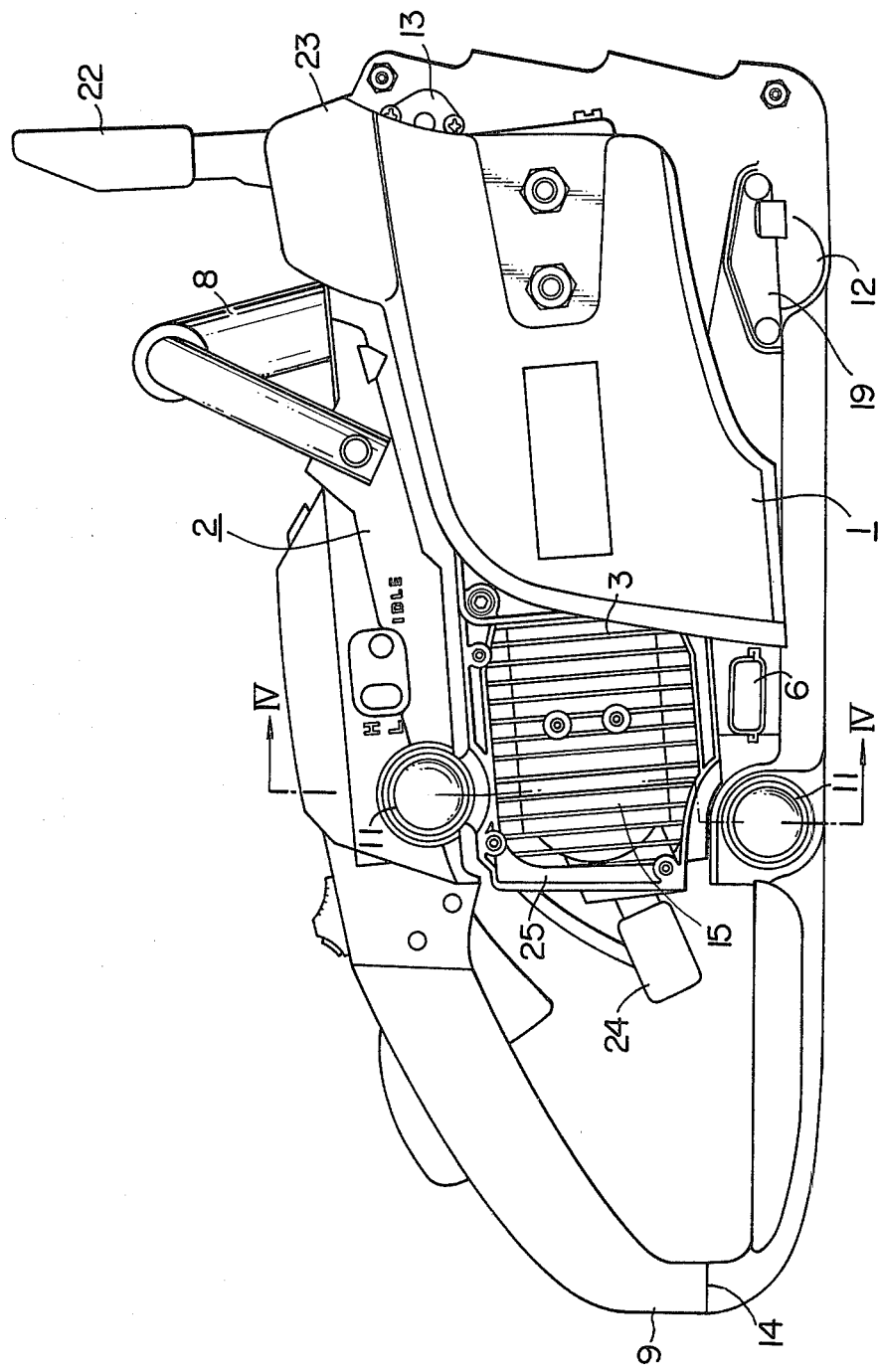
FIG. 1 is a side elevational view of a portable chain saw embodying the present invention.
Figure 2:
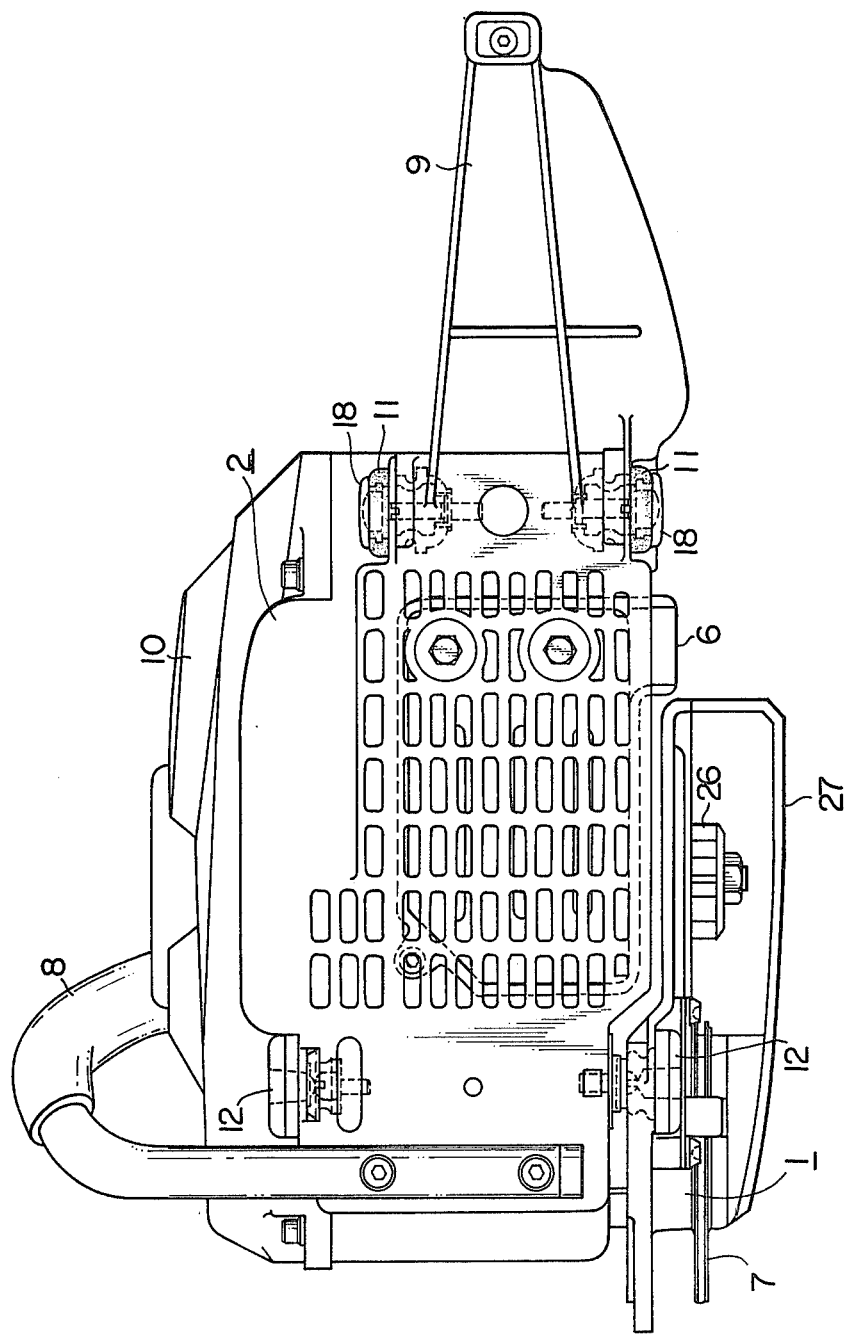
FIG. 2 is a bottom plan view of the chain saw as shown in FIG. 1.
Figure 3:
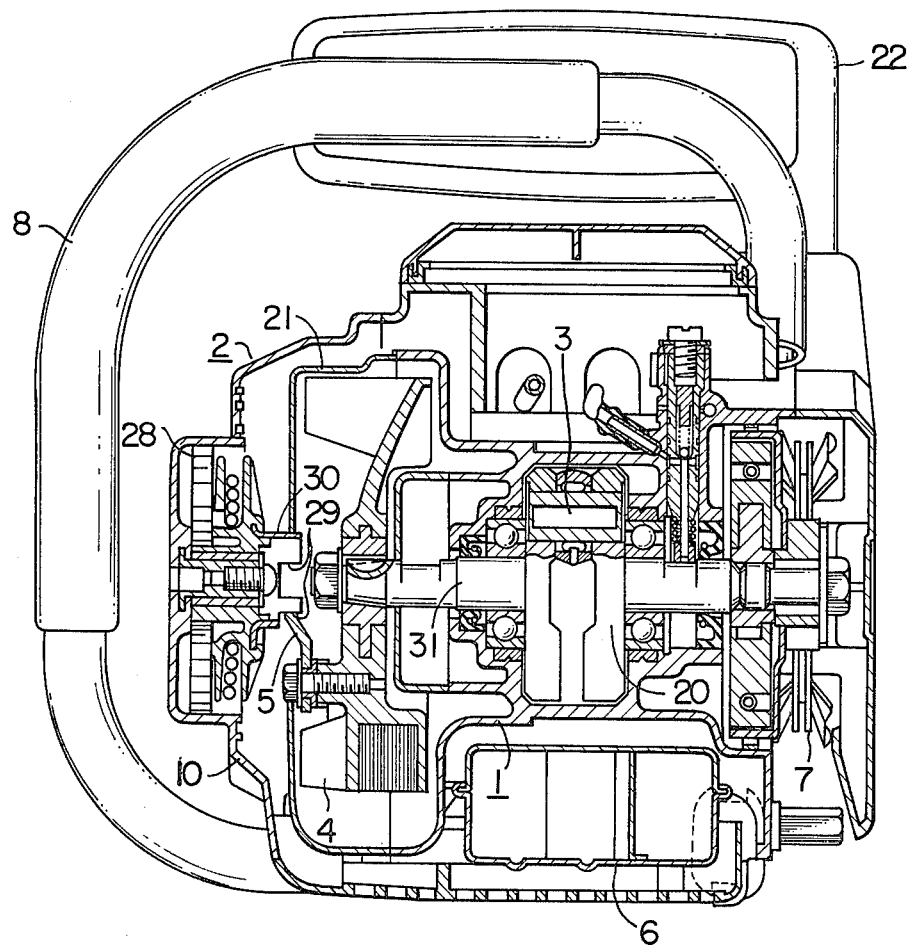
FIG. 3 is a sectional view of the chain saw taken along the plane including the axis of a crank shaft of engine mounted in the chain saw as shown in FIG. 1.

FIGS. 1 to 3 in combination show the general arrangement of the chain saw as a whole, particularly the locations of the resilient members and other parts of the chain saw in their assembled state.

Figure 4:
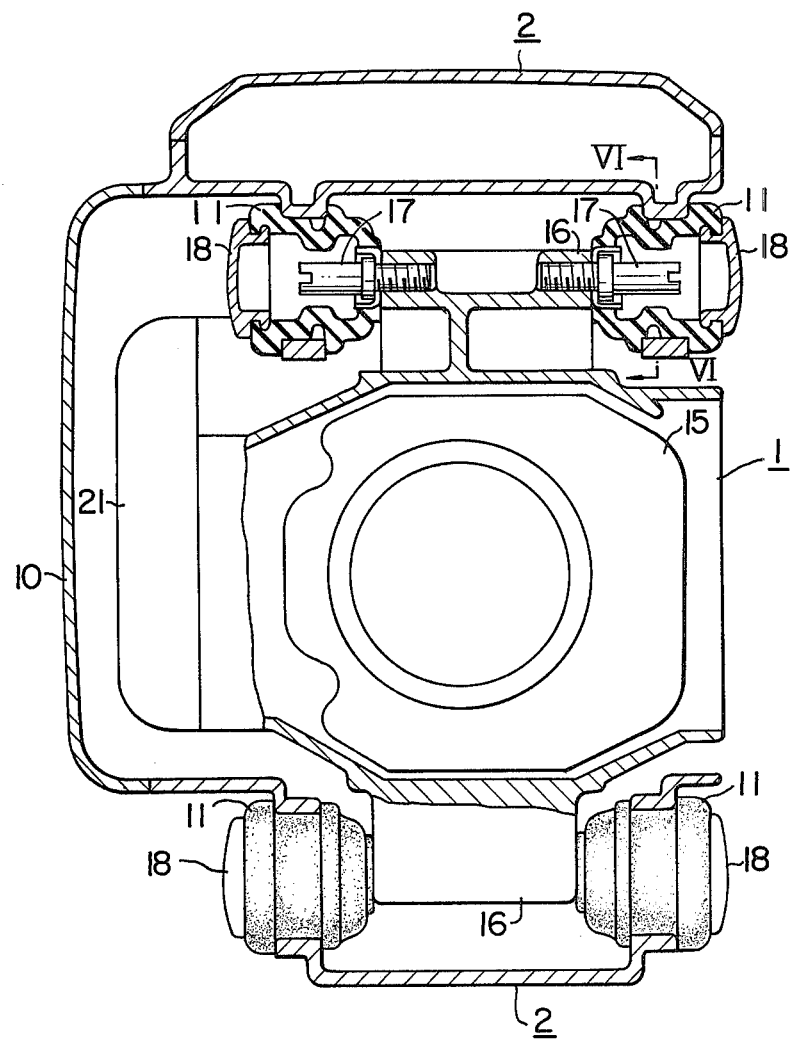
FIG. 4 is a sectional view taken along the line IV—IV of FIG. 1.
Figure 5:
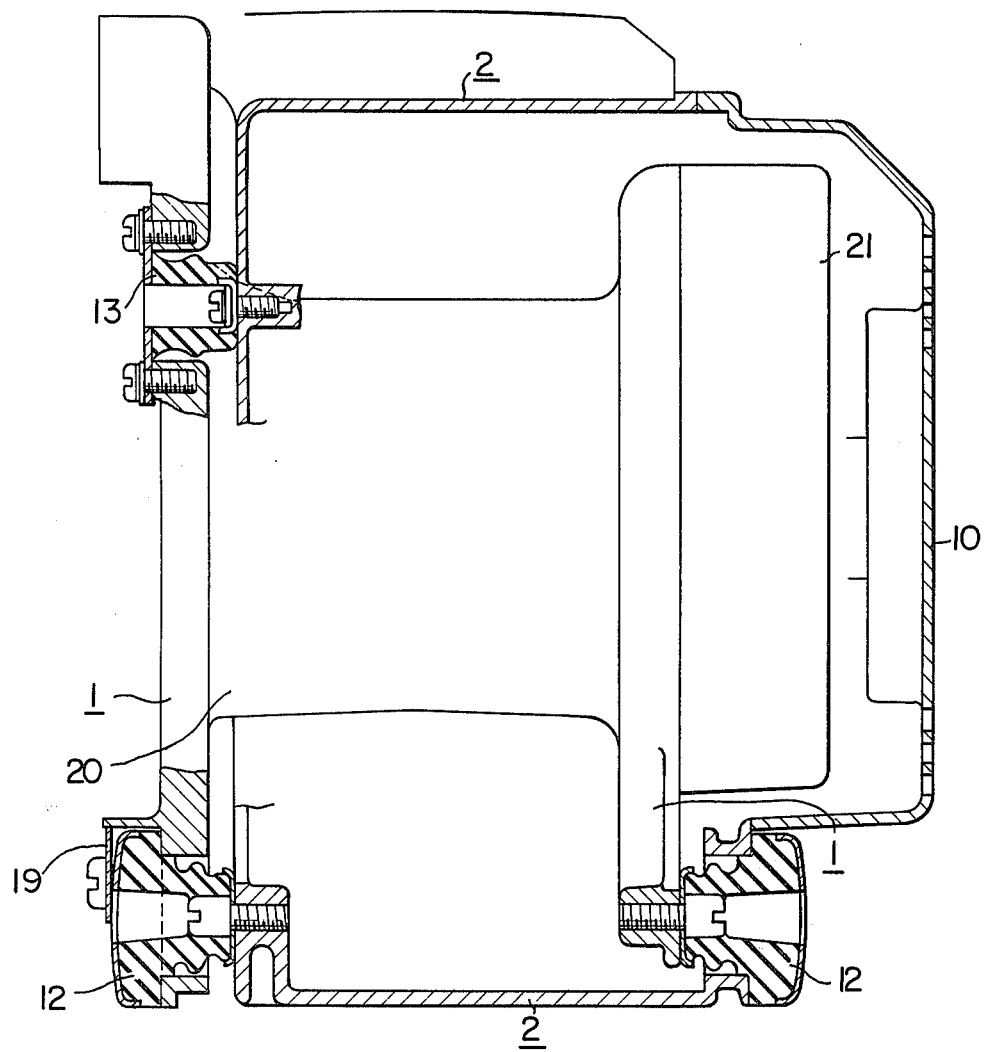
FIG. 5 is a sectional view of an essential part of the chain saw, specifically showing a front resilient member.
Figure 6:
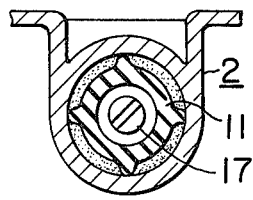
FIG. 6 is a sectional view taken along the line VI—VI of FIG. 4.

FIGS. 4 to 6 are used for explaining in detail the construction and function of the resilient member.

The chain saw of this embodiment has a saw chain extending forwardly from the right-hand side portion thereof, and consists of a drive-part assembly 1 and a supporting assembly 2.

More specifically, the drive part assembly 1 has, as shown in FIG. 3, an engine section 3 disposed at the center of this assembly, and a fan 4, and a claw 5 for a recoil starter clutch which are located at the left-hand side portion of the assembly as viewed on this Figure. Further, this assembly 1 includes a muffler 6 and a guide bar 7 which are disposed at the right-hand side portion of the chain saw as viewed on FIG. 3.

The supporting assembly 2 includes a front and a rear handles 8 and 9, a recoil case 10 and so forth.

These assemblies 1 and 2 are resiliently connected to each other through resilient members 11, 12 and 13 which are made of a high polymer such as rubber, synthetic resin or the like. Each of these resilient members has a hollow tubular form. The hollow tubular resilient member has a metallic plate attached to the bottom thereof, for retaining a screw, and is adapted to carry at its outer peripheral surface the aforementioned supporting assembly 2.

Referring first to the resilient member 11, as will be seen from FIG. 4 showing a cross-section and general view thereof, a recess is formed in the outer peripheral surface and is adapted to receive the brim of a circular fixing aperture formed in the wall of the supporting assembly 2, so as to be held by the latter.

At the same time, as will be seen from FIG. 1, the supporting assembly 2 is split into an upper and a lower parts at a junction 14 in the rear handle 9. For assembling the drive-part assembly 1 and the supporting assembly 2 into the state as shown in FIG. 1, resilient members 11 inserted to both of the upper and lower parts of the supporting assembly 2 are made to oppose to respective fixing projections 16 projecting from a cylinder 15 of the drive-part assembly 1. Then, screws 17 are inserted into the bore of the hollow tubular resilient member 11, and are driven into the threaded bores formed in the fixing projections 16, so that the resilient members 11 are connected to the fixing projections 16 in cantilever fashion. For obtaining a better appearance, caps 18 may be attached to one end of each resilient member 11, so that the screw 17 may disappear. Alternatively, a flange or a collar may be formed at the end of the resilient member 11, so as to make the diameter of the end opening smaller, thereby to make the screw 17 invisible, and the cap 18 is neglected. Further, the cap 18 may be substituted by a flat plate inserted into the bore of the resilient member 11.

It is also to be noted that the upper and the lower parts of the supporting assembly 2 are unitarily held by a recoil case 10. Therefore, in the assembled state as shown in FIG. 4, a sufficient stiffness of the supporting assembly 2 is ensured.

The use of the cap 18 is preferred, partly because it can diminish the deformation of the resilient member 11, and partly because the air confined in the resilient member 11 contributes to the achievement of desirable resilient characteristics.

By connecting the drive-part assembly 1 and the supporting assembly 2 to each other through the resilient members 11 having the described features, it is possible to largely damp the vibration of the drive-part assembly 1, so as to insulate the supporting assembly 2 almost completely from the vibration caused in the drive-part assembly 1. This entirely owes to the resilient members 11 which effectively and ideally absorb the vibrations of all directions.

Referring now to FIG. 5, there are shown resilient members 12, 13. Although these resilient members 12, 13 have different form from that as shown in FIG. 4, it is possible to use the resilient members of FIG. 4 in place of these resilient members 12, 13. The resilient members 12 has a stepped outer peripheral surface, adapted to be fitted to the brim of the corresponding circular fixing aperture formed in the drive-part assembly 1 or the supporting assembly 2. The resilient member 13 has a flat fixing plate attached to one end thereof. In assembling, these resilient members 12, 13 are put in alignment with the portions to which they are to be secured, after having been fitted to the circular fixing apertures, and are secured then by means of screws, as is the case of the resilient member 11. The resilient member 12 is covered with a metallic cover fixed thereto. At the same time, the resilient members 12 fitted to the fixing apertures in the drive-part assembly 1 are restrained from moving in the axial direction of the drive-part assembly 1, by means of a holder plate 19.

The resilient member 13 is fixed to the drive-part assembly 1, by means of screws which driven through the fixing plate.

The locations of these resilient members 11, 12 and 13 will be understood from FIGS. 1 and 2. It will be seen that the resilient member 13 is located only at one side of the chain saw where the saw chain is mounted. This is because the vibration is specifically large at that side of the chain saw. The lower resilient member 11 located at the same side of the chain saw as the resilient member 13 may be eliminated, if the resilient member 13 is made sufficiently large.

In these Figures, reference numerals 20, 21 and 22 denote, respectively, a crank case of the engine 3, a fan cover and a brake handle, while a chain-brake cover, ignition plug cap and a cylinder cover are designated by reference numerals 23, 24 and 25. Reference numerals 26 and 27 denote, respectively, a sprocket and a guide bar retainer.

The recoil starter 28 as shown in FIG. 3 is attached to the recoil case 10 of the supporting assembly 2, and has a clutch consisting of a cylindrical hub 30 having a peripheral notch 29, and a claw 5 adapted to be received by the notch 29. The claw 5 is attached to the fan 4 fixed to the engine crank shaft 31 of the drive-part assembly 1. Conventionally, the whole part of the recoil starter is arranged in the drive-part assembly 1. This arrangement often caused a misalignment of the mating members of the clutch due to the vibration. However, according to the invention, the centering of the clutch parts need not be so precise, because the misalignment attributable to the vibration does not take place, so that the assembling can be made easily. It has proved that this arrangement of the clutch constitutes also to the insulation of the supporting assembly 2 from the vibration.

As has been described, according to the invention, the horizontal and vertical components of the vibration caused by the drive-part assembly 1 are conveniently and effectively damped by the tubular resilient members 11, 12, 13 through which the drive-part 1 and the supporting assembly 2 are connected, so that the supporting assembly 2 is freed from the vibration. At the same time, the portable chain saw of the invention can be assembled quite easily, because the two assemblies 1, 2 are connected through the resilient members 11, 12, 13 after fitting these resilient members 11, 12, 13 to either one of these assemblies 1, 2.

In addition, the resilient members 11, 12, 13, which are adapted to be held by screws inserted in the bores thereof and to damp the vibration at their outer and inner peripheries, can be mounted quite easily, without requiring unnecessarily large mounting spaces in the assemblies 1, 2.

Further, even when the supporting assembly 2 is split into upper and lower parts, a sufficient stiffness of the assembly 2 can be obtained by connecting these parts unitarily by the recoil case 10. This arrangement contributes also to improve the vibration damping effect.

Still further, the trouble concerning the recoil starter 28 attributable to the vibration can fairly be avoided because the recoil starter 28 is mounted on the supporting assembly 2 which is freed from the vibration.

What is claimed is:

1. A portable chain saw comprising a drive-part assembly including an engine, a saw chain and the like, and a rear handle, and hollow, tubular, resilient members connecting said assemblies to each other, wherein the improvement resides in an arrangement with said resilient members being threadably connected to a side of said drive-part assembly in cantilever fashion through screws penetrating hollow portions of the resilient members, with said supporting assembly being fitted and held in place on the outer peripheries of tubular portions of said resilient members in a manner exposing one side of said supporting assembly, and with a side cover supporting a recoil starter fitted to said one side of said supporting member unitarily with the supporting assembly.

2. A chain saw as claimed in claim 1, wherein said supporting assembly comprises an upper supporting member and a lower supporting member, with said supporting assembly being connected to said drive-part assembly through said resilient members, with said side cover being in the form of a case supporting said recoil starter fitted to the one side of said supporting assembly unitarily therewith to impart rigidity to the supporting assembly.

* * * * *